United States Patent [19]
Richards

[11] Patent Number: 6,038,534
[45] Date of Patent: Mar. 14, 2000

[54] MIMICKING VOICE COMMANDS AS KEYBOARD SIGNALS

[75] Inventor: Kevin W. Richards, Mantua, Utah

[73] Assignee: Cowboy Software, Inc., Mantua, Utah

[21] Appl. No.: 08/927,338

[22] Filed: Sep. 11, 1997

[51] Int. Cl.[7] .............................. G10L 7/08; F16D 7/06
[52] U.S. Cl. ........................... 704/275; 364/188; 463/36
[58] Field of Search .................................. 704/231, 235, 704/270, 275, 200, 201; 364/188, 410.1; 463/35, 36

[56] References Cited

U.S. PATENT DOCUMENTS

| | | | |
|---|---|---|---|
| 4,776,016 | 10/1988 | Hansen | 704/275 |
| 5,208,745 | 5/1993 | Quentin et al. | 364/188 |
| 5,231,691 | 7/1993 | Yasuda | 704/200 |
| 5,317,505 | 5/1994 | Karabed et al. | 364/410 |
| 5,350,176 | 9/1994 | Hochstein et al. | 463/42 |
| 5,377,303 | 12/1994 | Firman | 704/275 |
| 5,544,654 | 8/1996 | Murphy et al. | 706/924 |
| 5,625,843 | 4/1997 | Lee | 704/201 |
| 5,659,665 | 8/1997 | Whelpley, Jr. | 704/275 |
| 5,826,874 | 10/1998 | Teitell et al. | 473/225 |
| 5,874,939 | 2/1999 | Galvin | 704/235 |
| 5,893,064 | 4/1999 | Kudirka et al. | 704/275 |
| 5,974,384 | 10/1999 | Yasuda | 704/275 |

*Primary Examiner*—David R. Hudspeth
*Assistant Examiner*—Martin Lerner
*Attorney, Agent, or Firm*—McDermott, Will & Emery

[57] ABSTRACT

A method and apparatus for generating keyboard commands in response to voice commands is described. An association between command strings and a set of keyboard combinations is established. Each command string is associated with a keyboard combination. Command strings are generated by a sound engine in response to voice commands. A keyboard combination is selected based on the association between keyboard combinations and command strings. The keyboard combination is sent to a computer system as mimicked signals from a keyboard. The keyboard combinations are mimicked as signals from the keyboard by sending the keyboard combination to a keyboard controller and then sending a message to the keyboard controller to send the key combination as signals generated from the keyboard. Alternatively, a keyboard message may be sent to the operating system running on the computer system, causing the computer system to respond to the keyboard combination as signals generated from a keyboard. The sound engine receives a voice command while the sound engine is generating sound. The command string associated with the command string is found and then transmitted. The command strings are associated with keyboard combinations that control the play of a computer game.

10 Claims, 7 Drawing Sheets

FIG. 3

Table 310

| Command String | Key Combination | Keyboard Man. Type | Repeat Count | Duration |
|---|---|---|---|---|
| AirBrakes | Ctrl+A | Hold | 1 | 3000 (3 secs) |
| ReleaseBrakes | Ctrl+A | Release | 1 | 0 |
| Flare | Ctrl+R | Hit | 5 | 0 |

318 —
320 —
322 —

MIMICKING VOICE COMMANDS AS KEYBOARD SIGNALS

FIELD OF THE INVENTION

The present invention relates to voice recognition by computer systems, and in particular, to generating keyboard commands from voice commands.

BACKGROUND OF THE INVENTION

Computer games are a very popular form of entertainment. Action oriented computer games, such as a flight simulators for war planes, are becoming more realistic and more sophisticated. Usually such games are played with input devices designed for computer game playing ("game input devices"), such as a joystick control and game pads.

To control the play of the game, the computer game software is configured to receive commands from the game player (user). Typically, the game software accepts, as commands from the user, signals from the keyboard, or signals from a game input device. Many game input devices provide buttons and other control mechanisms, such as a pan button, which are manipulated by the user to send a signal to the computer that the computer game software recognizes as a command. For example, a trigger button on a joystick attached to a joystick control may be depressed by the user to a fire the weapons of fighter jet. One button on the joystick control may be depressed to select a weapon, a second button may arm the weapon, a third button may disarm the weapon.

Typically the number of commands recognized by a computer game exceeds the number of controls that can be implemented on a game input device. Thus computer game software is typically configured to recognize a select set of commands as signals from game input devices. The remainder of the commands may be issued as signals from the keyboard. The select set of commands typically includes those commands that must be quickly issued in the various situations presented by the computer game. For example, one common situation presented by a computer game is a simulated dogfight. During a simulated dogfight, a user may need to quickly issue many commands, such as commands to control the airplane's thrust, airbrakes, rudder, radar, and weapons. When all the needed commands are part of the select set, the commands can be quickly issued through the game input device. The user does not have to move a hand to the keyboard to issue any command needed in the current situation facing the user. In light of fast pace of dogfight, the player can play much more effectively if all the needed commands may be quickly issued through the game input device.

Because the number of commands that can be part of the select set is limited, often in particular situations presented by computer games, there are commands that users need to issue which are not part of the select set. Thus, in situations where a command is not part of select set and the need for the user to issue the command arises, the user must take one or both hands off the game input device and move them to the keyboard to issue the command through the keyboard. In these situations, the user's ability to play effectively is impaired. For example, assume that commands that are most often needed in a simulated dogfight, such as commands that control the movement of the fighter jet and fire the air-to-air missiles and machine guns, are part of the select set of commands. However, the command that pans the view presented to the user on the computer screen to a perspective looking up from the jet fighter is not part of the select set. The need to issue the latter command does not occur as often as the need to issue the commands in the select set. However, because the need may occasionally occur during a dogfight, the user's ability to play effectively is impaired.

One approach to overcome the previously discussed problem is the integrated voice recognition approach. In the integrated voice recognition approach, the computer game software is configured to accept commands from a particular sound engine. As used herein, the sound engine refers to the hardware and software components on a computer system specifically responsible for receiving and interpreting sound input and generating sound output. For example, a computer system may include a sound card and sound card software. The sound engine receives sound from an external device, such as a microphone, and transmits data typically representing spoken words to an application running on the computer system. The behavior of the application is controlled based on the data received from the sound engine instead of or in addition to the input from a game input device.

The integrated voice recognition approach offers several advantages over the use of a keyboard during game play. First, commands not in the select set may be issued vocally without the user having to move a hand off the game input device to the keyboard. Second, the user is alleviated from the task of memorizing the various combinations of key strokes needed to issue the many commands typically needed to play a computer game. For example, rather than switch to a top view by pressing Shift-T, the user can simply say "top view".

A disadvantage of the integrated voice recognition approach is computer game software must be specifically programmed to interface with and receive input from sound engines. Because of the extra cost of developing game software that receives input from sound engines, many computer games do not offer integrated voice recognition.

Clearly, it is desirable to provide a mechanism that provides the ability to vocally issue commands when playing computer games that are not configured to interface with a sound engine.

SUMMARY OF THE INVENTION

A method and apparatus for generating keyboard commands in response voice commands is provided. According to one aspect of the invention, an association between command strings and a set of keyboard combinations is established. Each command string is associated with a keyboard combination.

Command strings are generated by a sound engine in response to voice commands. A keyboard combination is selected based on the association between keyboard combinations and command strings. The keyboard combination is sent to a computer system as mimicked signals from a keyboard. The keyboard combinations are mimicked as signals from the keyboard by sending the keyboard combination to a keyboard controller, and then causing the keyboard controller to send the keyboard combination as signals generated from the keyboard. Alternatively, a keyboard message may be sent to the operating system running on the computer system, causing the computer system to respond to the keyboard combination as signals generated from a keyboard.

According to another aspect of the invention, the sound engine receives a voice command while the sound engine is generating sound. The command string associated with the command string is found and then transmitted. The command strings are associated with keyboard combinations that control the play of a computer game.

According to another aspect of the invention, a command string, keyboard combination, and data identifying a type of keyboard manipulation is received from a user. A mapping of the command string to the keyboard combination and type of keyboard manipulation is stored in the computer system. If the type of keyboard manipulation is the "hold" type, a duration is received from the user.

According to another aspect of the invention, if the keyboard combination is mapped to a hit type of keyboard manipulation, then the keyboard combination is sent to the computer system mimicked as a key combination that is depressed and immediately released. A repeat count may be received from the user. The sending of the keyboard combination to mimic a keyboard signal that is depressed and immediately released is repeated for the number of times corresponding to the repeat count.

According to another aspect of the invention, if the keyboard combination is mapped to a hold type of keyboard manipulation with no specified duration, then the keyboard combination is sent to the computer system mimicked as a key combination that is depressed indefinitely. A subsequent command string from the sound engine is received, the subsequent command string being associated with a release type of keyboard manipulation. In response to receiving the subsequent command string, another keyboard combination is sent to mimic a signal generated from the keyboard that the keyboard combination that is depressed indefinitely is no longer depressed.

According to another aspect of the invention, if the keyboard combination is mapped to a hold type of keyboard manipulation and a duration greater than zero, then the keyboard combination is sent to the computer system to mimic a key combination that is depressed for a period of time and then released. The sending of the keyboard combination to mimic a keyboard signal that is depressed, held for a period of time, and then released is repeated for the number of times corresponding to the repeat count.

According to another aspect of the invention, an association between a command string and a set of keyboard combinations is established. An association between the command string and a repeat count is also established. The keyboard combination is sent to the computer system, for the number of times indicated by the repeat count, as mimicked signals from the keyboard.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is table showing attribute values of exemplary key objects and the command string attribute values of the command objects which contain the key objects;

DETAILED DESCRIPTION OF THE PREFERRED EMBODIMENT

A method and apparatus for generating keyboard commands from spoken commands is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1A:
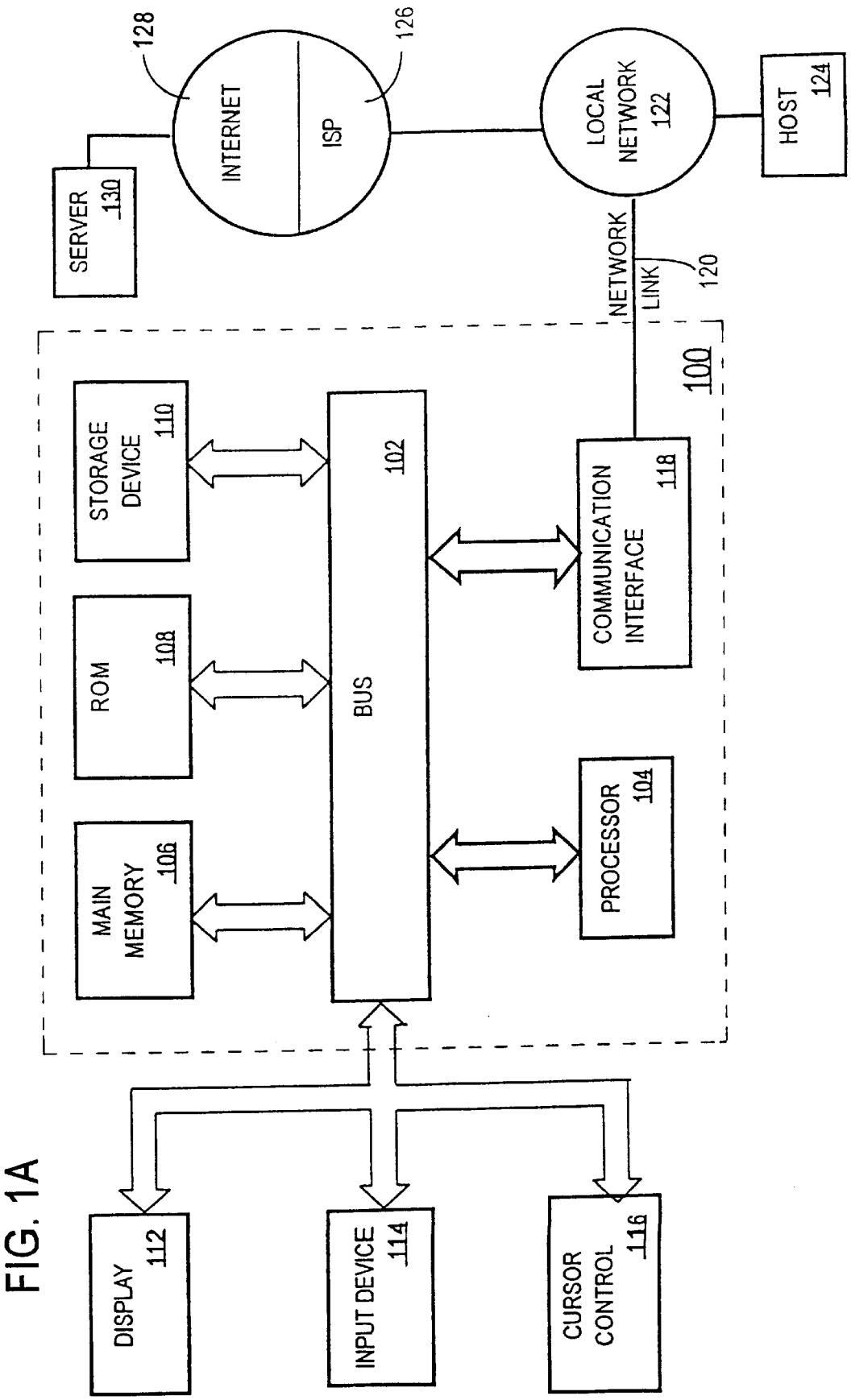
FIG. 1A is a block diagram of a computer system on which the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for generating keyboard commands from spoken commands. According to one embodiment of the invention, the generation of keyboard commands from spoken commands is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for generation of keyboard commands from spoken commands as described herein.

The received code may be executed by processor 104 as it is received, and/or stored in storage device 110, or other non-volatile storage for later execution. In this manner, computer system 100 may obtain application code in the form of a carrier wave.

Figure 1B:
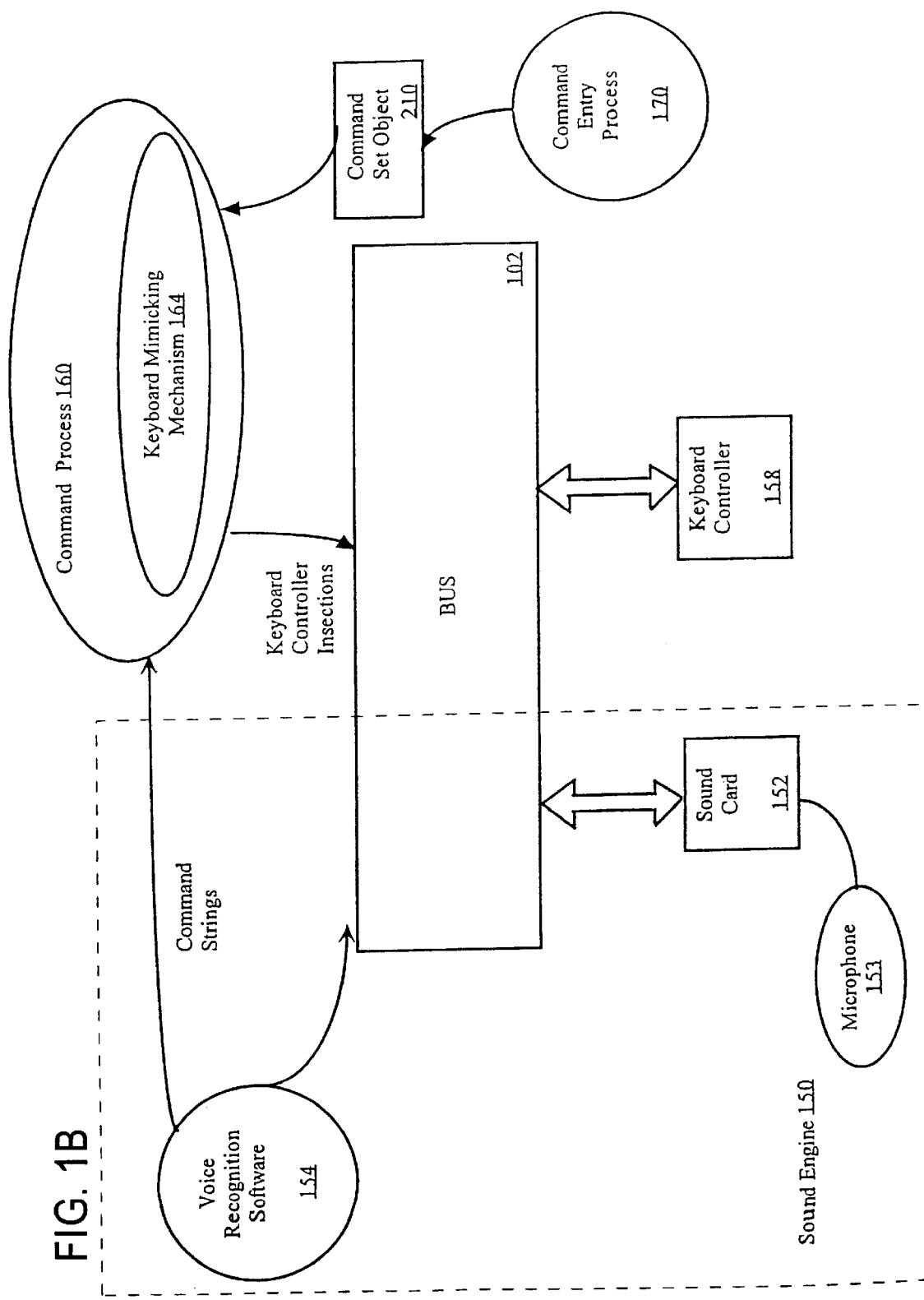
FIG. 1B is block diagram showing particular components of a computer system on which the present invention may be implemented.

Referring to FIG. 1B, FIG. 1B is a block diagram showing additional components upon which an embodiment of the invention operates. Keyboard controller 158 is a standard keyboard controller which may be connected to a keyboard. An example of keyboard controller is the Intel 8042.

One or more keyboard ports logically connect keyboard controller 158 to bus 102. In this context, the term "port" refers to the logical connection between computer system 100 and the keyboard controller 158. Each keyboard port is identified by a number that is used to select and address the port interface. When a key on the keyboard is depressed or released, the keyboard controller 158 receives signals from the keyboard indicating which key has been depressed or released. The keyboard controller 158 then uses the keyboard ports to communicate the depressed or released key to computer system 100.

Through use of the keyboard ports, the keyboard controller 158 is also configured to receive signals from computer system 100 that to the keyboard controller 158 indicate that a particular key on the keyboard has been depressed or released. As shall be discussed in greater detail below, computer system 100 sends such signals to the keyboard controller 158 to cause the keyboard controller 158 to communicate to computer system 100 that the particular key has been depressed or released.

SOUND ENGINE

Sound engine 150 includes sound card 152 and voice recognition software 154. A microphone 153 is connected to the sound card 152. The voice recognition software 154 and sound card 152 together compare incoming utterances from a user to an active vocabulary to determine whether the spoken utterances match any word or phrase in the active vocabulary. If a match is found, the sound engine 150 transmits a message to computer system 100. The sound engine 150 is capable of running in full duplex mode.

Full duplex, as used herein, refers to the ability of sound engine 150 to generate sound while concurrently receiving spoken utterances and transmitting messages to the computer system 100 in response to matching the spoken utterances to an active vocabulary. Alternately, an additional sound card may used, one for receiving utterances from the user, the other for generating sound.

COMMAND SETS AND ENTRY

When the user types in a sequence of keystrokes, data representing the keystrokes is typically delivered from the keyboard controller 158 to the software application running on the computer system 100. If the software application running on the computer system 100 recognizes the data representing the sequence of keystrokes as one or more commands, the software performs one or more corresponding actions. Thus, by entering a sequence of keystrokes, a user is able to control the execution of a software application.

A command set is a set of keyboard commands. A keyboard command is a sequence of one or more keystrokes that may be entered by a user on a keyboard to control the execution of a software application running on the computer system 100. According to one embodiment, a command set object 210 is used to represent and manipulate data for a particular command set. Typically, a command set comprises a set of keyboard commands used to control the execution of one software application, such as a computer game.

For example, consider an exemplary fighter jet simulator. By repeatedly depressing and releasing the keys 'Ctrl+R' five times in sequence, the user causes the fighter jet simulator to release five sets of flares. Note the "Ctrl" and "R" represent keys on a keyboard. The "+" sign between the Ctrl and "R" is a common form of notation denoting that the keys are pressed simultaneously. The sequence of depressing and releasing 'Ctrl+R' is a keyboard command.

Figure 2:
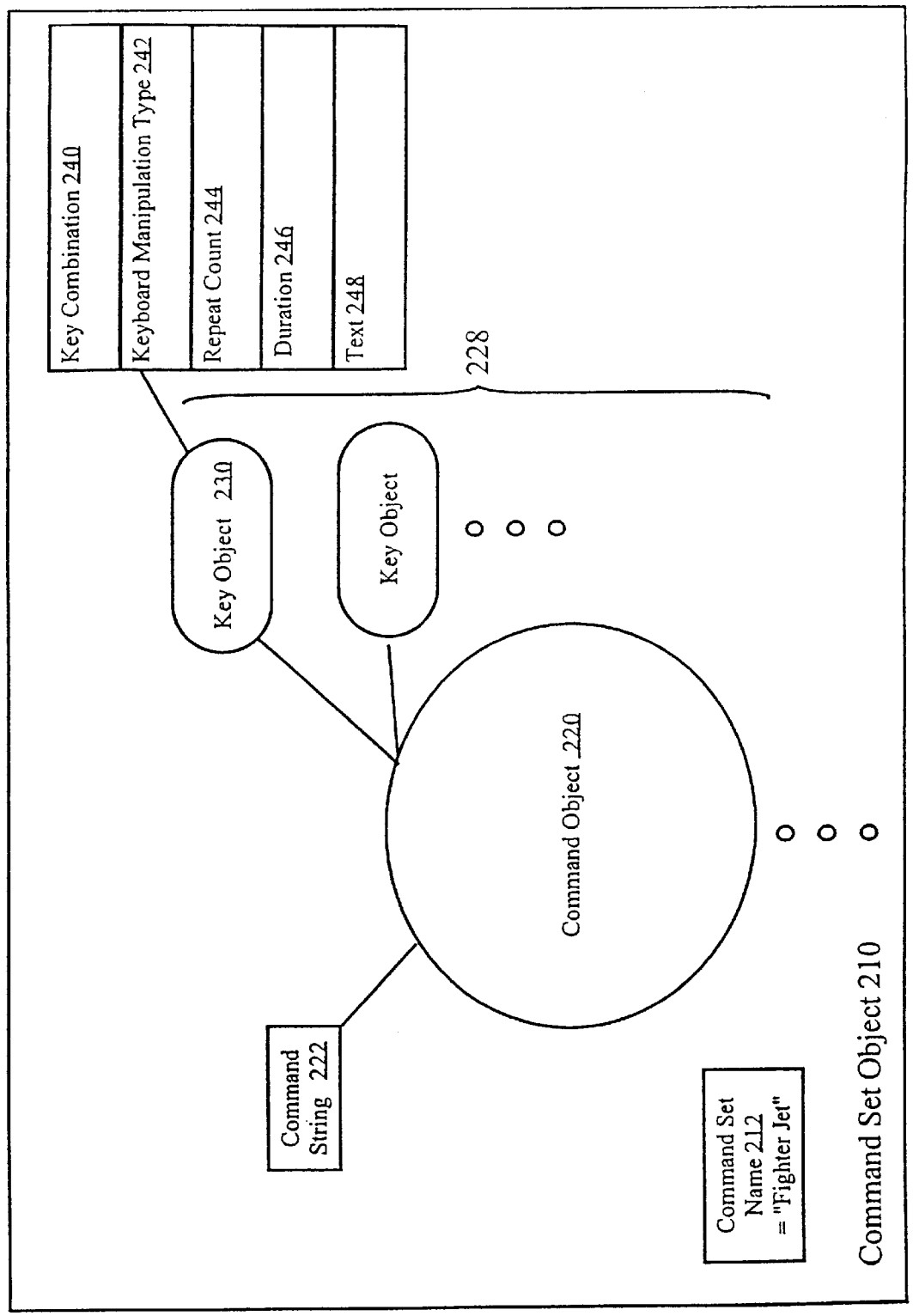
FIG. 2 is a block diagram showing objects used to represent command sets.

FIG. 2 shows exemplary command set object 210 in greater detail. An object is a record of data combined with the procedures and functions that manipulate the record. All objects belong to a class. All objects belonging to the same class have the same fields ("attributes") and the same methods. The methods are the procedures and functions used to manipulate the object. An object is said to be an "instance" of the class to which the object belongs. The techniques described herein are not limited to object oriented software. For example, object classes correspond to abstract data types, objects correspond to instances of abstract data types, and the methods of an object correspond to the routines that are used to perform operations on data contained in instances of abstract data types.

Command set object 210 contains data representing a command set. A command set object has a command set name attribute 212 and a collection of one or more command objects 220. Exemplary command object 220 has a command string attribute 222 and one or more key objects 228. As shall be described in further detail, the command string attribute 222 is used to associate command object 220 with a voice command.

Command object 220 contains a collection of key objects 228, of which key object 230 is an example. A key object belongs to the key object class. According to one embodiment, each key object has the following attributes: key combination 240, keyboard manipulation type 242, repeat count 244, duration 246, and text 248.

The key combination attribute 240 stores data that represents a combination of a keyboard key and key modifiers that modify the key, such as shift, Ctrl, and Alt keyboard keys. 'Ctrl+R' is an example of a key combination.

The keyboard manipulation type attribute 242 stores data which represents the manner in which a user manipulates a key. In an embodiment of the invention, there a three types of keyboard manipulation types. The first is the "hit" type. The "hit" type represents a key combination that is depressed and immediately released. An example of "hit" keyboard manipulation type is depressing 'Ctrl+R' to release a flare and immediately releasing it.

The second keyboard manipulation type is the "hold" type. The "hold" type represents depressing a key combination for a period time before releasing the key combination. Depressing the 'F' key to fire the machine gun in a fighter jet simulator without releasing the key for two seconds is an example of "hold" keyboard manipulation type.

The duration attribute 246 stores data that represents the period of time that a key remains depressed. If the duration attribute value represents an indefinite period of time (e.g. a zero or nonnumeric value), then the period of time that the key remains depressed is indefinite (i.e. until a "release" is issued manner which shall be described).

The third keyboard manipulation type is the "release" type. The "release" type represents a release of a key combination. A "release" type of key object is usually created in tandem with a "hold" type of key object having an indefinite duration. As shall be described in further detail, release" type of key objects are used to logically release a key that is being depressed ("held") for an indefinite period of time.

The repeat count attribute 244 represents the number of times the key combination is repeated.

The text attribute 248 stores data that represents other keys that are to be depressed and released after the key combination has been repeated. For example, if the text attribute of a key object contains "mkb", then a pair of key-down and key-up instruction sequences are sent for each character in the "mkb" in the order the character appears in the text.

COMMAND SET ENTRY

Figure 4:
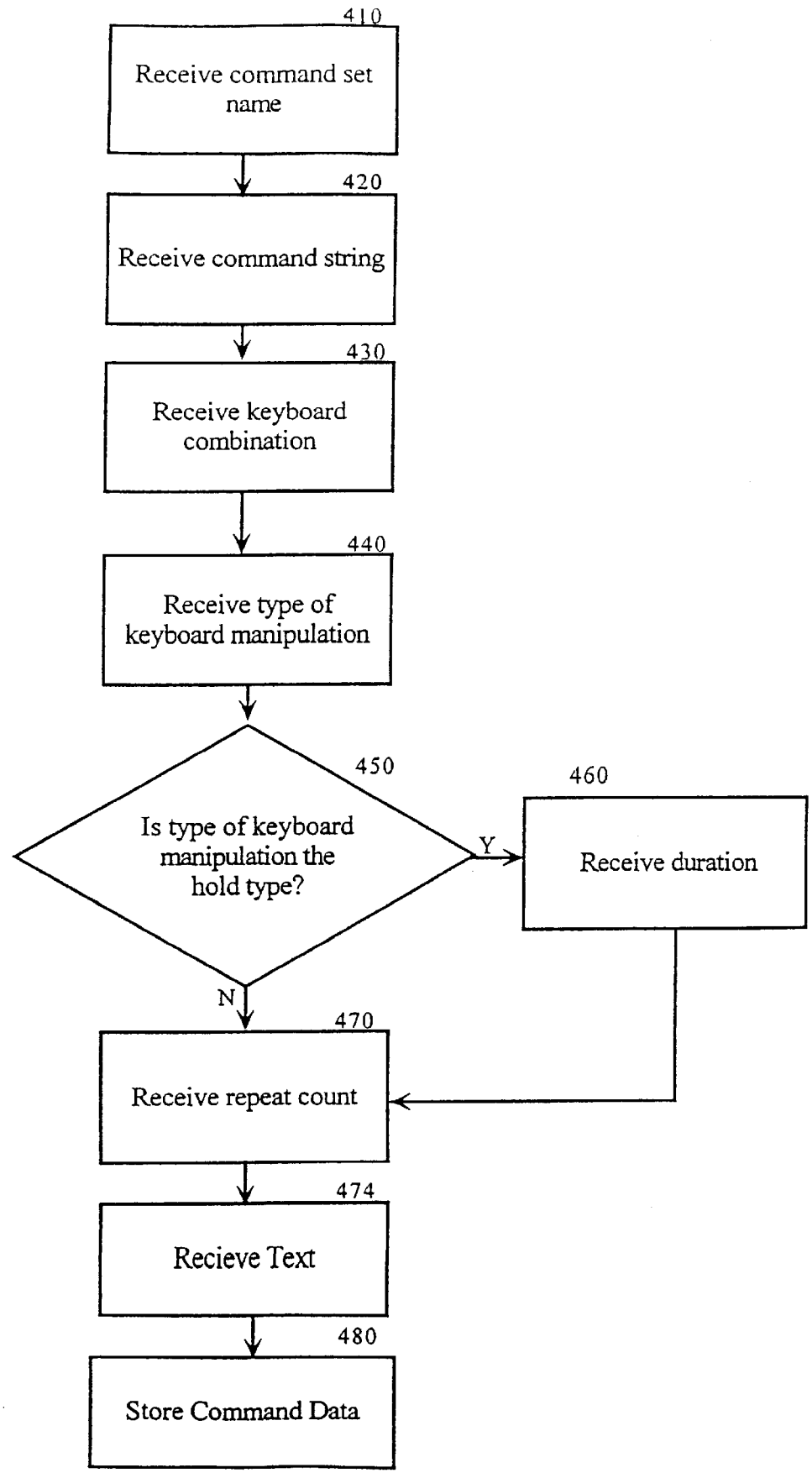
FIG. 4 is a flowchart showing steps performed to collect data for creating command sets.

FIG. 4 is a flow chart showing the steps of a method for creating a command set. In one embodiment of the invention, command set entry process 170 (FIG. 1A) provides a graphical user interface to the user for the purpose of collecting data from the user. An example of a graphical user interface is a dialogue box object invoked by software developed using the Microsoft Foundation Class Library. The user enters data by, for example, typing on a keyboard or by manipulating a mouse to point to and click on a graphical control, such as option button in an option button control, available as part of the Microsoft Foundation Class Library.

The steps illustrated in FIG. 4 are performed to collect data used to create command objects, and to collect data used to create key objects for each of the command objects. When the desired command objects are created for a command set, the command set, along with command objects and key objects contained by the command set, are stored in command file on a static storage device 110 for later retrieval in manner which shall be described in further detail.

To facilitate in the description of the steps shown in FIG. 4, it shall be assumed that it is desired to create a command set with a command set name of "Fighter Jet" to be used to play a computer game called "Fighter Jet". The command set contains a keyboard command for applying the airbrakes for 3 seconds. A user may issue a command to apply the airbrakes by depressing Ctrl+A for the desired period of time the users wishes to apply the air brakes.

At step 410, a command set name is received from the user. In this example, assume the user types "Fighter Jet" on the keyboard, and that the command set entry process 170 receives the string "Fighter Jet".

At step 420, a command string is received. In this example, assume the user types "AirBrakes" on the keyboard, and that the command set entry process 170 receives the string "AirBrakes".

At step 430, a keyboard combination is received when the user depresses the keys corresponding to the desired keyboard combination. In this example, the user depresses 'Alt+A', causing the command set entry process 170 to receive a string corresponding 'Alt+A'.

At step 440, data representing a keyboard manipulation type is received. In this example, assume the user uses a mouse to click on a particular option button in option control presented in the user interface. The particular option button is designated as the button to click if the keyboard manipulation type desired is the "hold" type. Command set entry process 170 receives data indicating that the "hold" type was selected by the user.

At step 450, a determination is made of whether the "hold" type was received in at step 440. If the determination made is that the "hold" type was not received, then control passes to step 460. If the determination made is that data representing the "hold" type was received, then control passes to step 460, as is the case in this example.

At step 460, data representing the duration is received. The data received represents a number of milliseconds. Any data received that does not indicate a number considered by the command set entry process 170 to represent a duration of zero. A duration of zero is considered to be a duration for an indefinite period of time. Control then passes to step 470. In this example, the user types in the number 3000, and the command set entry process 170 receives data indicating that the duration is 3000 milliseconds (3 seconds).

At step 470, data representing the repeat count is received. The data received represents a number. Any data received that does not indicate a number is processed by the command set entry process 170 as if the number "1" had been received. In this example, the user types in nothing, and command set entry process 170 receives data representing that nothing has been entered by the user. Command set entry process 170 therefore presumes that the number "1" was entered.

At step 474, any text entered by the user is received and stored in the text attribute 248 of the key object 230. In this example, no text is received.

At step 480, command data is stored in the computer system 100 based upon the input received from the user. According to one embodiment of the invention, the command data is stored in the form of a command set object 210, with its associated attributes. In such an embodiment, step 480 includes creating command set object 210 in memory (if not already created) and storing the received information in the appropriate attributes within command set object 210.

Specifically, the string "Fighter Jet" is stored in the command set name attribute 212 of the command set object 210. If command object 220 does not yet exist, then memory is allocated for command object 220 and the string "AirBrakes" is stored in the command string attribute 222 of the command object 220. If key object 230 does not exist, then memory key object 230 is allocated and data representing the keyboard combination is stored in the key combination attribute 240 of key object 230. Data indicating the keyboard manipulation type "Hold" is stored in the keyboard manipulation type attribute 242 of key object 230. Data indicating a repeat count of "1" is stored in repeat count attribute 244. Data indicating a duration of three seconds is stored in duration attribute 246. No text is stored in text attribute 248.

Command set objects can contain any number of command objects. Therefore, steps 420 through 480, during which data is collected for a command object, may be repeated any number of times to populate a command set object with any number of command objects. Similarly, command objects may contain any number of key objects. Therefore, steps 430 through 480, during which data is collected for a key object, may be repeated any number of times to populate a single command object In this example, a command set object with a command set name attribute value of "Fighter Jet" is created. A command object with a command string attribute value of "AirBrakes" is then created and made one of the command objects contained by the command set object just created. Then a key object is created, having a key combination, keyboard manipulation type, repeat count, duration, and text attribute values of "Alt+A", "Hit", 1, 3000, and"" respectively. Then the key object is made one of the key objects contained by the command object just created.

The collection of key objects contained within a command set object establishes a mapping between the attributes of each key object in the collection and the command string attribute of the command object containing the collection. In the above example, the key combination, keyboard manipulation type, repeat count, duration, and text attributes with the values of "Alt+A", "Hit", 1, 3000, and"" are considered mapped to the command string attribute having the value "AirBrakes".

At step 480, the command set object, along with the objects contained by it, are stored in a command file in storage device 110. The file is stored under the file name that corresponds to the command set. Techniques for storing objects in files, and for storing objects under a file name are well known to those skilled in the art and shall not be further described.

ESTABLISHING VOICE COMMAND SET

Sound engine 150, like most of those available on the market, provide utilities for establishing sets of voice utterances (i.e. phrases, words) recognizable by the sound engine. Each voice utterance which is recognized by the sound engine is herein referred to as voice command. Each voice command is associated with a command string. For example, the voice utterance represented by the word "fire" may be associated with the command string "fire".

Voice recognition software 154 provides a user interface for organizing voice commands as sets, and for designating a voice command set as the active set of voice commands presently recognizable by the sound engine (the "active vocabulary"). When a user utters a voice command (i.e. an utterance presently recognizable by the sound engine), the sound engine transmits a message to command process 160. A message transmitted in response to receiving a voice command to the command process 160 is herein referred to as a voice command message.

In one embodiment of the invention, the Windows95 operating system, which is generally available from Microsoft Corporation, is running on computer system 100. The voice command message is transmitted to command process 160 through the messaging mechanism provided by the Windows95 operating system. The message includes the command string associated with the voice command.

Note that while the present invention has been described with reference to one mechanism for transmitting voice command messages, other mechanisms are possible. Therefore, it is understood that the present invention is not limited to any particular mechanism for transmitting messages.

COMMAND MODULE

The command process 160 is the process that is responsible for receiving command strings that represent voice commands from the sound engine 150. The command process 160 is also responsible for determining whether the command string received from the sound engine 150 is associated with any key combinations, and is responsible for transmitting information about how to mimic the keyboard combination to the key mimicking mechanism 164. The keyboard mimicking mechanism is responsible for sending the keyboard combination as mimicked keyboard signal to the computer system 100.

The command process 160 is started by the user. The techniques available for starting processes vary according to the operating system running on computer system 100. Because the techniques are well known, they shall not be further described.

Figure 5:
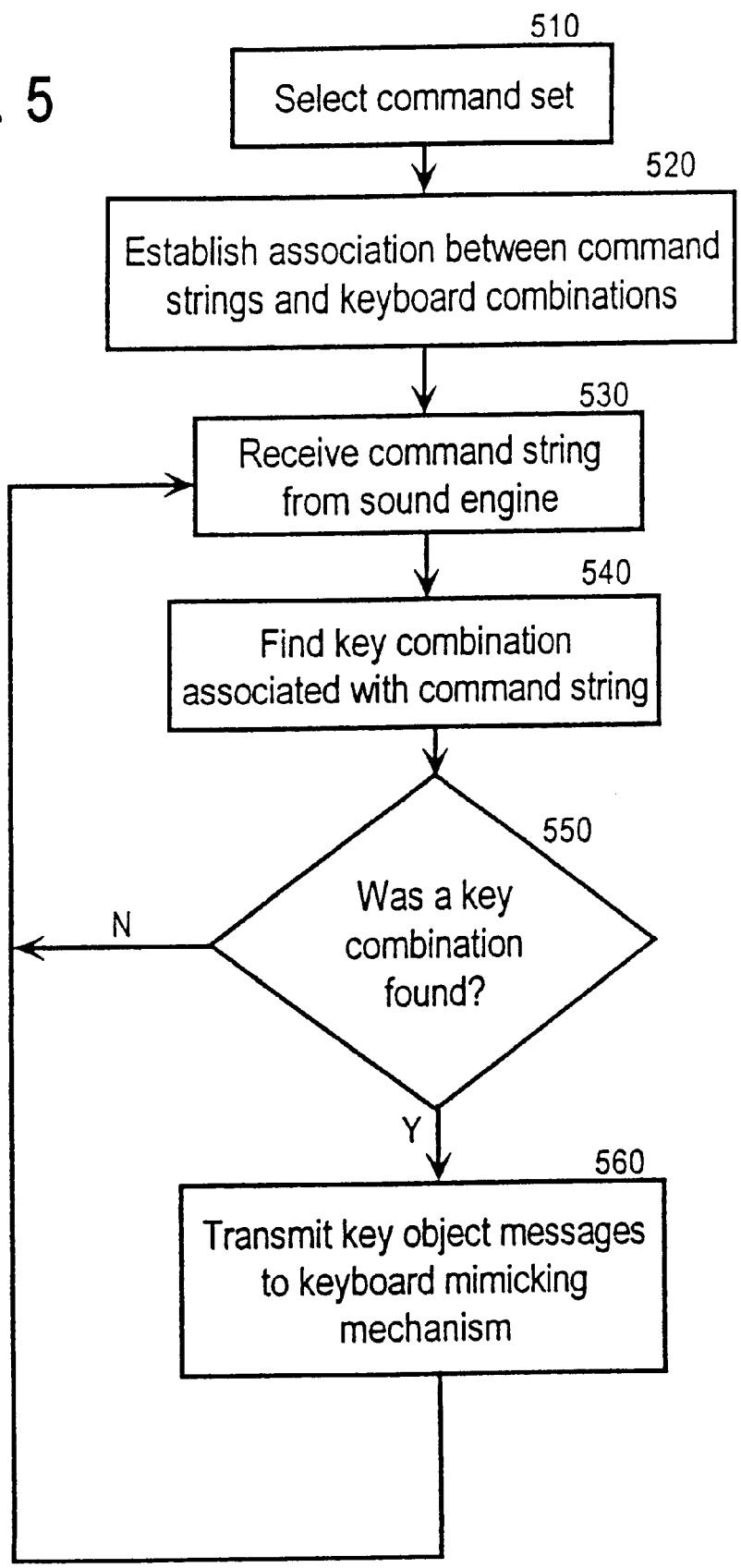
FIG. 5 is a flowchart showing the steps performed in response to receiving voice commands from a sound engine.

FIG. 5 is a flowchart depicting steps performed by command process 160. To facilitate the description of the steps, an example is provided based on table 310, shown in FIG. 3. Table 310 illustrates the values of attributes of three command objects that belong to the "Fighter Jet" command set object 210. Each entry in table 310 represents a key object contained in one of the command objects of the command set object 210.

The value shown in the command string column for any particular entry in table 310 represents the command string attribute value of the command object that contains the key object represented by the entry. For each entry, the values shown in the key combination, keyboard manipulation type, the repeat count, and the duration columns represent the values of attributes for the particular object represented by the entry. For example, the entry 322 represents an key object contained by a command object with a command string attribute of 'Flare'. The key object has key combination, keyboard manipulation type, the repeat count column, and the duration attribute values of "Ctrl+R', 'Hit', five (repeat count), zero (duration).

For purposes of illustration, none of key objects represented by table 310 have text attributes containing any value. Thus table 310 contains no column for text.

At step 510, the command set is selected. An interface for selection of the file containing the command set object of the command set desired by the user is presented to the user. When the user selects a file, data is received indicating which file was selected. There are many well known mechanisms that may be used to provide an interface for selection of files, and therefore they shall not be further described. In this example, assume the user selects the file used to store the command set object with a command set name attribute value of "Fighter Jet".

At step 520, an association between command strings and key combinations is established. For example, in an embodiment that uses the data structures shown in FIG. 2, the command set object 210, and the objects it contains (i.e. command objects and the key objects contained in the command objects) are retrieved from the file selected at step 520. A list of the command objects in the command set object is generated. As previously mentioned, attributes of the key objects are considered to be mapped to the command string attribute of the command object that contains the key object. Thus the list of command objects embodies an association between command strings and key combinations. In this example, Table 310 illustrates the association between the command strings and key combinations. Each entry represents a mapping between the attributes of the object key represented by the entry and the command string shown for the entry.

Steps 530 through 560 represent a loop for receiving command strings and locating the key combinations associated with the command strings. If a received command string is associated with at least one key combination, a message is transmitted to the keyboard mimicking mechanism. The keyboard mimicking mechanism shall be described in further detail.

At step 530, a command string is received. The sound engine 150 transmits a message to the command process 160 when the sound engine 150 receives a voice command. The message transmitted from the sound engine 150 includes the command string associated with the voice command. In this example, assume the sound engine is operating in full duplex mode and is generating sound when the user issues the voice command "air brakes". In response, the command string "AirBrakes" is received.

At step 540, the key combination associated with the command string, if any, is found. The list of objects is searched for a command object with a matching command string attribute. In this example, the command object with the command string attribute value of "AirBrakes" is found. The command object that is found is referred to herein as the requested command object.

At step 550, it is determined whether at least one key combination associated with a command string was found in step 540. If a command object is found in step 550, then at least one key combination associated with the command string is found. If at least one key combination associated with a command string was found, then control passes to step 560. Otherwise execution ceases until another voice command is issued. In this example, because a command object was found in step 540, control passes to step 560.

At step 560, key object messages are transmitted to the keyboard mimicking mechanism. Each key object in the requested command object is processed. For each key object, a key object message containing data representing the attributes of the key object is transmitted to the keyboard mimicking mechanism. In transmitting the message for the key object to the keyboard mimicking mechanism 164, the key combination represented by the key object is placed in a queue by the keyboard mimicking mechanism 164.

After step 560, execution ceases until another voice command is received. In this example, the command process 160 iterates through the key object represented by entry 318 (the only key object contained in the requested command object). The command process 160 sends to keyboard mimicking mechanism 164 data representing the attributes of the key object represented by entry 318. Execution then ceases until subsequent voice command is received.

KEYBOARD MIMICKING MECHANISM

Figure 6:
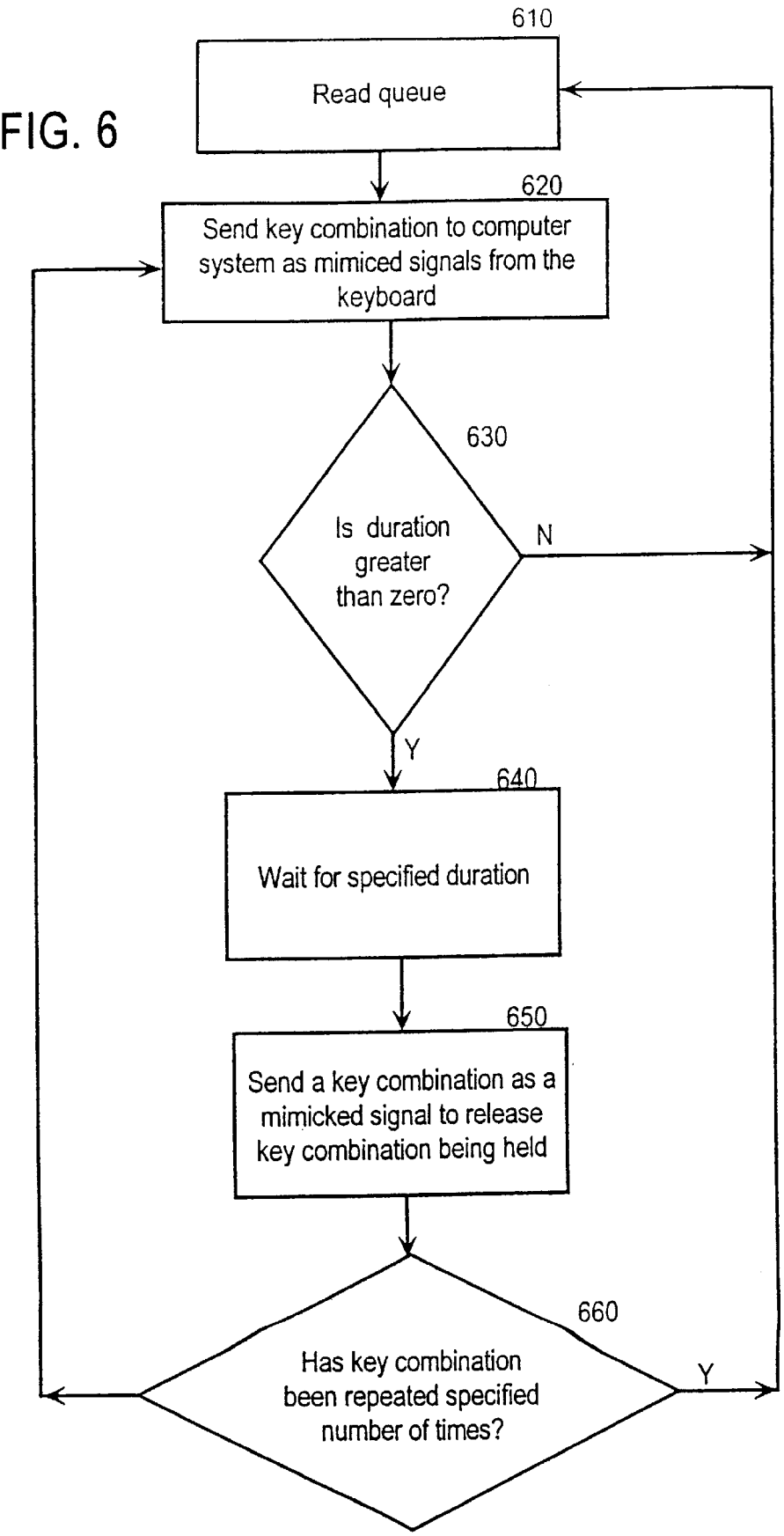
FIG. 6 is a flowchart showing the steps performed to mimic key combinations as signals from a keyboard.

FIG. 6 is a flowchart showing steps performed by keyboard mimicking mechanism 164. The act of receiving key combinations and generating signals that, to computer system 100, appear to be signals generated by a user pressing keys on the keyboard, is referred to as mimicking signals generated by a keyboard. Another process running on the computer system 100, such a computer game process, responds to these mimicked keyboard signals as it does to any signal actually generated by the keyboard. To facilitate the description of the steps, the example previously discussed is continued.

The keyboard mimicking mechanism 164 is shown in FIG. 1B as a thread executing as part of command process 160. Alternatively, the keyboard mimicking mechanism 164 may be a separate process executing in an address space separate from the address space in which command process 160 is executing.

The keyboard mimicking mechanism 164 receives the key object messages from the command process 160. The data received in the key object message is added as an entry in a FIFO queue. Each entry of the FIFO queue is an object belonging to the object key class. An object that is an entry in the FIFO queue is referred to as a queued object. Because a queued object belongs to the key object class, each entry has a key combination, keyboard manipulation type, repeat count, duration, and text attribute.

Referring to FIG. 6, at step 610, the keyboard mimicking mechanism 164 reads the next entry from the FIFO queue. If there is no entry in the queue, the execution of steps 610 through 650 is suspended for a period time, or suspended until a key object message is received. The queued key object that is read in step 610 is referred to as the current queued object. In this example, assume there is one entry in the queue, which is the queued object represented by entry 318 in Table 310.

At step 620, the key combination represented by the current queued key object is sent to the computer system 100 as mimicked signals from the keyboard. The manner in which the signals are mimicked depends on the attributes of the current queued object.

According to an embodiment of the invention, keyboard controller 158 supports at least three controller commands: a new instruction command, a key command, and a send key command. The new instruction command indicates to the keyboard controller 158 that a new instruction representing a data byte is about to be sent. The new instruction command is transmitted by writing a command byte to a first port address configured to accept the command byte.

The key command represents a key, and whether the key is being depressed or released. The key command is transmitted by writing a data byte to a second port address configured to accept the data byte.

The send key command signals the keyboard controller to send the key represented by the key command to the computer system 100 as a signal generated by the keyboard. This command is transmitted by writing a command byte to the first port address configured to accept such a command byte.

Transmitting a sequence of controller commands to the keyboard controller 158 will cause the keyboard controller to send signals to the computer system 100 that indicate that a particular key has been depressed or has been released. A sequence of controller commands that cause the keyboard controller 158 to send a signal that a particular key combination is being depressed is referred to as a key-down instruction sequence. A sequence of controller commands that causes the keyboard controller 158 to send a signal that a particular key combination is being released is referred to as a key-up instruction sequence.

If the current queued object has a keyboard manipulation type attribute value of "hit", the key mimicking mechanism sends a sequence of key-down instruction sequences and key-up instruction sequences representing the particular key combination represented by the current queued object to the keyboard controller. If the repeat count for the queued object is greater than one, the sequence of key-down instruction sequences and key-up instruction sequences is repeatedly sent to the keyboard controller 158 for the number of times corresponding to the repeat count.

If the current queued object has a keyboard manipulation type attribute value of "release", then the keyboard mimicking mechanism 164 sends a sequence of key-up instruction sequences representing the particular key combination represented by the current queued object to the keyboard controller 158. If the repeat count for the queued object is greater than one, the sequence of key-up instruction sequences is repeatedly sent to the keyboard controller 158 for the number of times corresponding to the repeat count.

If the current queued object has a keyboard manipulation type attribute value of "hold", then the keyboard mimicking mechanism 164 sends a sequence of key-down instruction sequences representing the particular key combination represented by the current queued object to the keyboard controller 158.

Finally, if the text attribute contains any text, then a pair of key-down and key-up instruction sequences are sent for each character in the text in the order the character appears in the text. The pair of key-down and key-up instruction sequences sent for each character are for the key combination corresponding to the character. Control then passes to step 630.

In the present example, the current queued object's keyboard manipulation type attribute value is "hold". Key-down instruction sequences representing the key combination 'Ctrl+A' are sent to the keyboard controller 158. Specifically, a key-down instruction sequence representing the depression of the 'Ctrl' key is sent, followed by a key-down instruction sequence representing the depression of the key 'A'.

At step 630, it is determined whether the duration attribute value of the current queued object is greater than zero. If the duration is not greater than zero, then the queued object is removed from the queue and control passes to step 610. Otherwise, control passes to step 640. In this example, the duration is three seconds, so control passes to step 640.

At step 640, the keyboard mimicking mechanism 164 pauses execution of the steps for the period of time specified by the duration attribute. The keyboard mimicking mechanism 164 uses a timer mechanism to wait for the period of time specified. The use of timer mechanisms are well know to those skilled in the art and shall not be further described.

After the period of time has expired, control passes to step 650. The effect of pausing in this manner is to signal to the computer system 100 that the key combination is being depressed for the period of time corresponding to the duration attribute value. When the key combination is being signaled to the computer system 100 in this manner, the key combination is considered "held". In this example, the keyboard mimicking mechanism 164 waits for a period of three seconds. Then control passes to step 650.

In step 650, a key combination is sent to the computer system 100 as a mimicked signal from the keyboard to "release" the key combination being held. In this example, the key-up instruction sequence for the key 'A' is sent to the keyboard controller 158, followed by a key-up instruction sequence for the key 'Ctrl'.

In step 660, it is determined whether the "holding" and "releasing" of the key combination represented by the current queued object has been repeated the number of times specified in the repeat count. If is determined that "holding" and "releasing" of the key combination represented by the current queued object has been repeated the number of times specified in the repeat count, then control passes to step 610. Otherwise, control passes to step 620.

Note that when the current queued object has a keyboard manipulation type attribute value of 'hold' and a duration attribute value of zero, no corresponding key-up instruction sequence is sent at step 650. The key combination represented by the queued object is to be held indefinitely. The key combination is released only when the keyboard mimicking mechanism 164 performs the step 630 on a queued object having the same key combination attribute value and a keyboard manipulation type attribute value of 'release' (or 'hit').

Assume that the current queued object in the present example has a duration attribute value representing an indefinite duration. Then at step 630, it is determined that duration attribute value of current queued object has a duration not greater than zero. Therefore, control passes to step 620, leaving the key combination represented by the current queued objects as a key combination being held indefinitely.

Assume that after a few seconds the next key object message is received, and he data from the message is inserted into the queue. The queued object just inserted is represented by the entry 320, and because it is the next queued object to be read at step 610, that queued object is the current queued object. The queued object corresponds to the key-combination that is mapped to the command string 'ReleaseBrakes'.

At step 630, in the present example, a key-up instruction sequence is sent for the key 'A', followed by a key-up instruction sequence for the key 'Ctrl'. Sending the key-up instruction sequences in this manner releases the key combination that was being held indefinitely.

Assume now that the current queued object is represented by entry 322 in FIG. 3. At step 620, the keyboard mimicking mechanism 164 transmits a key-down instruction sequence for 'Ctrl', followed by a key-down instruction sequence for 'R'. This pair of key-down instruction sequences is immediately followed by a key-up instruction sequence for 'R', and then by a key-up instruction sequence for 'Ctrl'. Because the repeat count attribute value of the current queued object is five, the two pairs of key-down and key-up instruction sequences are repeatedly sent five times before execution of the steps proceeds to step 630.

While one keyboard mimicking mechanism 164 has been described, others alternatives are possible. Therefore, it is understood that the present invention is not limited to any particular mechanism for mimicking key combinations as signals from a keyboard. For example, one alternate keyboard mimicking mechanism 164, operating on a computer system 100 running on the Windows95 operating system, may send a key-down and key-up event messages to the Windows95 operating system. The computer system 100 responds to these event messages as signals generated by a keyboard.

The key combinations sent by the keyboard mimicking mechanism 164 appear as regular keyboard commands to software running on computer system 100. Many software applications, such as computer games, are configured to respond to such keyboard commands. This feature allows the user who desires to control a software application through voice commands, to select a particular sound engine from the many sound engines available on the market, even though the particular sound engine is not specifically configured to interface with the software application.

To use a desired set of voice commands to control a particular application not configured to interface with the sound engine, the user first creates, using the voice recognizer software, a set of desired voice commands. Each of the voice commands are mapped to a command string. Then the user creates a file representing a command set containing the commands to be used in conjunction with the particular application. Each of the commands are associated with a command string mapped to a voice command by creating command objects with matching command string attributes in the manner described. For each of the command objects, key objects corresponding to the desired command set commands are generated.

After the command objects and key objects are stored in a command file, the command process 160 is started. The command file containing the command set to be used with the particular application is selected. Then the user uses the voice recognizer software to make the desired set of voice commands the active set of voice commands. Finally, the user speaks the voice commands to control the particular application. The particular application may be controlled by voice commands without ever being configured to interface with any particular sound engine.

In an alternate embodiment of the invention, a repeat count ("command level repeat count") is associated with each command object. Each command object has a command level repeat count attribute. The command level repeat count represents the number of times to repeat the series of keyboard commands represented by the set of key objects associated with the requested command object.

For example, assume that in a fighter jet simulator it desirable to release flares, and to immediately follow the release of flares with the release of chaff, and to repeat this sequence of releasing flares and chaff three times. Chaff comprises strands of metal which are expelled from an airplane in order to confuse missiles guided by radar. A command object associated with the voice command "flaff", and associated with key objects representing the keyboard commands necessary to release the flares and chaff, is created in manner described previously.

In addition, steps for collecting data to create a command object (shown in FIG. 4) include a step to receive data representing the command level repeat count attribute for the command object. Assume in this example, data representing a command level repeat count value of three is received. Then data needed to create the key objects representing the release flare keyboard command ('Ctrl+R') and release chaff keyboard command ('Ctrl+H') is received.

When the voice command "flaff" is issued by a user, then at step 560 (FIG. 5), the step for transmitting a key object message for each key object associated with the requested command object, is repeated for the number of times indicated by the repeat count attribute of the requested command object, which is three. Thus, the set of key objects represented by requested command object is placed in the FIFO queue for the number of times indicated by the repeat count attribute. Thus a key object representing the release of flares is placed in the queue, followed by the key object representing the release of chaff. Then another pair of these key objects is placed in the queue, followed by a third pair.

The keyboard mimicking mechanism operates in the manner similar to that described earlier. The keyboard mimicking mechanism processes the key objects in the order in which they were placed in the queue. As a result, key combinations representing three pairs of a release of flares and a subsequent release of chaff, are transmitted as mimicked keyboard signals.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for sending signals to a computer system, the method comprising the steps of:

establishing an association between a set of command strings and a set of keyboard combinations, wherein each command string from said set of command strings is associated with at least one keyboard combination from said set of keyboard combinations;

receiving from a sound engine a command string generated in response to a voice command;

selecting a keyboard combination based on said association between the set of command strings and the set of keyboard combinations; and sending the keyboard combination to the computer system to mimic signals generated by a keyboard; and generating sound output from the sound engine while said sound engine is receiving said voice command and operating in full duplex mode.

2. The method of claim 1, wherein the step of establishing the association between the set of command strings and the set of keyboard combinations includes establishing an association between the set of command strings and a set of keyboard combinations that control play in a computer game.

3. The method of claim 1, wherein the step of sending the keyboard combination includes the steps of:

sending the keyboard combination to a keyboard controller; and sending a set of messages to the keyboard controller to send the key combination to the computer system as a signal generated from the keyboard.

4. The method of claim 1, wherein the step of sending the keyboard combination includes the step of sending a keyboard message to an operating system running on said computer system, the keyboard message being a message to which said operating system responds as signals generated by said keyboard.

5. A method for sending signals to a computer system the method comprising the steps of:

establishing an association between a set of command strings and a set of keyboard combinations, wherein each command string from said set of command strings is associated with at least one keyboard combination from said set of keyboard combinations;

receiving from a sound engine a command string generated in response to a voice command;

selecting a keyboard combination based on said association between the set of command strings and the set of keyboard combinations; and sending the keyboard combination to the computer system to mimic signals generated by a keyboard;

receiving from a user the command string;

receiving from a user the keyboard combination;

receiving from a user data identifying the type of keyboard manipulation; and storing a mapping of said command string to said keyboard combination and the type of keyboard manipulation;

wherein the step of receiving from a user data identifying the type of keyboard manipulation includes the steps of:

receiving data representing a duration associated with the type of keyboard manipulation if the data identifying the type of keyboard manipulation identifies the type of keyboard manipulation as a hold type;

storing a mapping of the command string to the duration;

wherein the step of sending the keyboard combination further includes, if the duration associated with the keyboard combination is set to a value that represents infinity, the step of sending the selected keyboard combination to the computer system to mimic signals generated by the keyboard as a keyboard combination that is depressed indefinitely;

wherein the method further comprises the steps of receiving a subsequent command string from the sound engine, said subsequent command string being associated with the keyboard combination and a release type of keyboard manipulation; and in response to receiving said subsequent command string, sending to the computer system a keyboard combination to mimic signals generated by the keyboard that signal to said computer system that the keyboard combination that is depressed indefinitely is no longer depressed.

6. A computer-readable medium carrying sequences of instructions for sending signals to a computer system, the sequences of instructions including instructions which, when executed by one or more processors, cause the one or more processors to perform the steps of:

establishing an association between a set of command strings and a set of keyboard combinations, wherein each command string from said set of command strings is associated with at least one keyboard combination from said set of keyboard combinations;

receiving from a sound engine a command string generated in response to a voice command;

selecting a keyboard combination based on said association between the set of command strings and the set of keyboard combinations; and sending the keyboard combination to the computer system to mimic signals generated by a keyboard; and generating sound output from the sound engine while said sound engine is receiving said voice command and operating in full duplex mode.

7. The computer-readable medium of claim 6, wherein the step of establishing the association between the set of command strings and the set of keyboard combinations includes establishing an association between the set of command strings and a set of keyboard combinations that control play in a computer game.

8. The computer-readable medium of claim 7, wherein the step of sending the keyboard combination includes the steps of:

sending the keyboard combination to a keyboard controller; and sending a set of messages to the keyboard controller to send the key combination to the computer system as a signal generated from the keyboard.

9. The computer-readable medium of claim 7, wherein the step of sending the keyboard combination includes the step of sending a keyboard message to an operating system running on said computer system, the keyboard message being a message to which said operating system responds as signals generated by said keyboard.

10. A computer-readable medium carrying sequences of instructions for sending signals to a computer system, the sequences of instructions including instructions which, when executed by one or more processors, cause the one or more processors to perform the steps of:

establishing an association between a set of command strings and a set of keyboard combinations, wherein each command string from said set of command strings is associated with at least one keyboard combination from said set of keyboard combinations;

receiving from a sound engine a command string generated in response to a voice command;

selecting a keyboard combination based on said association between the set of command strings and the set of keyboard combinations; and sending the keyboard combination to the computer system to mimic signals generated by a keyboard;

receiving from a user the command string;

receiving from a user the keyboard combination;

receiving from a user data identifying the type of keyboard manipulation; and storing a mapping of said command string to said keyboard combination and the type of keyboard manipulation;

wherein the step of receiving from a user data identifying the type of keyboard manipulation includes the steps of:

receiving data representing a duration associated with the type of keyboard manipulation if the data identifying the type of keyboard manipulation identifies the type of keyboard manipulation as a hold type;

storing a mapping of the command string to the duration;

wherein the step of sending the keyboard combination further includes, if the duration associated with the keyboard combination is set to a value that represents infinity, the step of sending the selected keyboard combination to the computer system to mimic signals generated by the keyboard as a keyboard combination that is depressed indefinitely;

wherein the computer-readable medium carries sequences of instructions for receiving a subsequent command string from the sound engine, said subsequent command string being associated with the keyboard combination and a release type of keyboard manipulation; and in response to receiving said subsequent command sting, sending to the computer system a keyboard combination to mimic signals generated by the keyboard that signal to said computer system that the keyboard combination that is depressed indefinitely is no longer depressed.

* * * * *